Patented Jan. 28, 1941

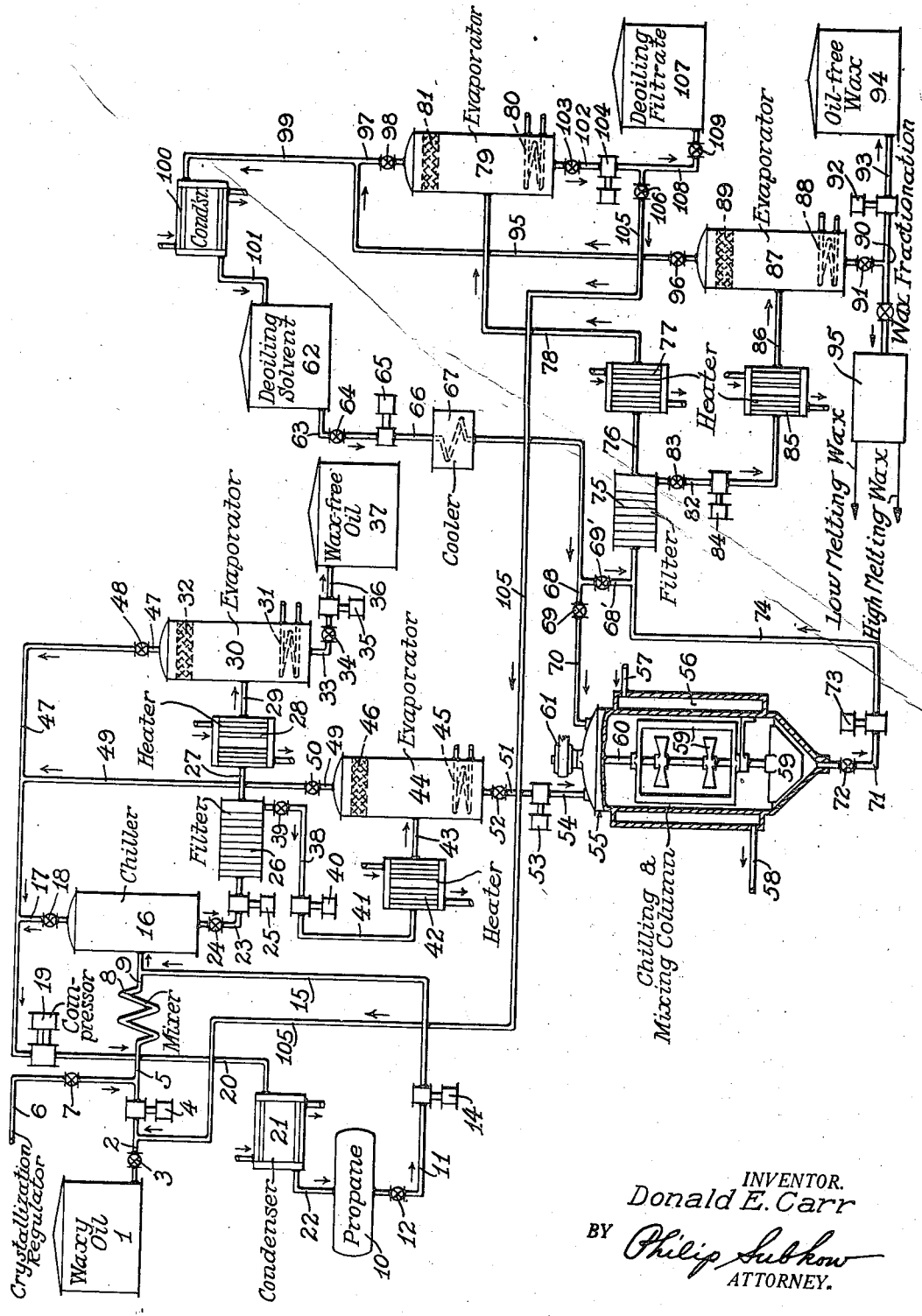

2,229,659

UNITED STATES PATENT OFFICE 2,229,659

PROCESS FOR SEPARATING WAX FROM OIL

Donald E. Carr, Los Angeles, Calif., assignor to Union Oil Company of California, Los Angeles, Calif., a corporation of California Application October 18, 1937, Serial No. 169,641

5 Claims. (Cl. 196—18)

The present invention relates to the separation of oil and wax from wax-oil mixtures such as waxy oils or oily waxes. The invention also relates to a process for separating wax and oil from wax oil mixtures to produce low pour test lubricating oils and oil-free waxes of high melting point. The invention relates particularly to an improvement in dewaxing processes employing crystallization regulators.

In a conventional process for separating wax from oils, the oil is dissolved in a solvent or mixture of solvents at an elevated temperature and then the solution is chilled to a sufficiently low temperature to effect precipitation of the wax which is subsequently removed by filtration, settling or centrifuging. In some cases, a small amount of a wax separation aid or crystallization regulator is mixed with the oil prior to the admixture with the solvent. This material is also precipitated with the wax. The solvents employed are those which show a preferential solubility for oil over wax at the dewaxing temperature, such as various mixtures of benzene and acetone, benzene and methyl ethyl ketone, propane, naphtha, etc. These solvents are very fluid at low temperatures and reduce the viscosity of the oil to such an extent that very low temperatures may be employed with the result that oils dewaxed by this type of operation may have pour points lower than 0° F. Washing of the wax cake on the filter with fresh cold solvent is usually carried out. However, the type of structure assumed by the wax when precipitated from the solvents adapted for use is such that the wax cake is very voluminous and porous. This leads to rapid filtration but the cake retains a large amount of solvent and dissolved oil and its porosity causes it to wash poorly. It is not unusual for washed wax cakes obtained in this type of operation to contain as much as 60% or more of oil. The weight of solvent present in the so-called dry cake is usually two to four times that of the wax present. This type of operation gives a soft wax cake which cracks badly and such cracking leads to very poor washing qualities.

The above is particularly true in the refining of wax-oil mixtures containing high melting point waxes as in the case of distilled oils of high viscosity. It has been observed that such oils form more voluminous precipitates than oils containing low melting waxes when equal weights of the two waxes are crystallized from equal dilutions in the same solvent. As a result when an oil containing high melting point wax is dewaxed by the aforementioned solvent dewaxing processes, the yield of dewaxed oil is lower than that obtained by dewaxing in the same solvent and in the same solvent ratio, an oil which contains the same amount of low melting point wax. The reason for this is that the more voluminous wax cake obtained from the oil containing high melting point wax retains a greater percentage of the oil-solvent solution than does the less voluminous wax cake obtained from the oil containing the low melting point wax. This difference in yield is especially noticeable in the dewaxing of solvent-extracted raffinates of high wax contents as the oils have been stripped of any naturally-occurring crystallization regulators by the process of solvent extraction.

Consequently, in order to recover an oil-free wax from the thus produced slack wax, it is necessary to subject the slack wax to further treatment. One of the methods commonly employed to deoil such waxes is the so-called sweating processes. However, such processes are slow and ineffectual to produce waxes of extremely low oil contents. Another method which has been suggested is to disperse the wax in a suitable solvent having a low solvent power for wax at the temperature of operation and then separate the undissolved wax from the oil and solvent. By properly adjusting the temperature of dispersion, it is possible to dissolve oil and low melting point waxes in the solvent and thereby effect a separation from the high melting point waxes. When the separation of the slack wax has been made from the original oil in the presence of a crystallization regulator, it is necessary to remove the crystallization regulator either before the deoiling process or subsequent thereto, before the wax can be marketed as a water-white wax. Usually this is accomplished by treating the wax with sulphuric acid and/or clay.

Thus it is observed in the aforementioned process that a considerable portion of the oil is lost to the low melting point waxes resulting from the deoiling step and that the filter aid is lost in the acid and/or clay treatment.

I have discovered a process of dewaxing in which I reduce the amount of crystallization regulator to be employed in the process to the amount used initially in starting up the process, and in which I may also recover the low melting point waxes as oil-free fractions. I have found that if the deoiling of the slack wax is carried out with a solvent and at a temperature such that the low melting point wax, oil and crystallization regulator are soluble in the solvent at the temperature employed and if this solution, either stripped of solvent or containing the solvent, is recycled to the raw stock to be dewaxed and subjected again to dewaxing, I may effect a saving in not only the amount of crystallization regulator used in the process, but I may also recover the low melting waxes as deoiled fractions in the same deoiling operation of the high melting point waxes. Also, I may obtain a higher yield of low pour point oil in the same operation. Thus the amount of crystallization regulator will be reduced to that required in starting up the process which amount is recovered by the deoiling solvent and recycled to a fresh batch of stock to be dewaxed. The oil in the slack wax processed in the deoiling operation is also recovered by the deoiling solvent along with low melting point waxes, which oil is recovered as low pour point oil by being reprocessed in the dewaxing process.

I have found it to be perfectly feasible to dewax oil under conditions in which the solubility of wax is sufficiently low to produce low pour point oil, to deoil the slack wax under conditions in which a fraction of this wax and also the crystallization regulator is soluble in the filtrate, and to recycle this second filtrate through the dewaxing process. The feasibility of this process may be explained by the following principles: In the dewaxing of wax-oil mixtures, the wax content of the filtrate stream is determined solely by the conditions of wax separation, i. e., temperature and amount of diluent or solvent employed. Low melting point wax, for example, has at a given temperature, a certain solubility in a given solvent. The amount of a given wax fraction present in a given filtrate will of course not exceed the equilibrium concentrations of this filtrate for this fraction. Therefore, since the conditions during the deoiling operation uniquely determine the concentration of the low melting point wax in the recycled filtrate, the result over a series of cycles will necessarily be that the low melting point wax content of the deoiled wax is increased until a steady state is reached, at which point the concentration of low melting point wax in the deoiling filtration becomes constant, and the wax produced by deoiling represents the entire range of wax fractions present in the original charge.

Stated differently, the deoiling of slack wax to produce high melting point wax is necessarily with such an amount of solvent to effect solution of the oil and the low melting point wax without saturation of the solvent with these components. If only such amount of solvent is employed as to completely saturate the solvent with these components, any excess of these components in the slack wax will remain with the undissolved high melting point wax. Since oil is more soluble in the solvent at the temperature employed, the result will be that as between the oil and the low melting point waxes, the solvent will have a preferential solubility for the oil, thereby dissolving all of the oil and such amount of the low melting point waxes as will saturate the solvent. The excess of low melting point wax will remain as insoluble fractions with the high melting point waxes. Since the repeated recycling of the deoiling filtrate to the dewaxing process builds up a concentration of the low melting point waxes in the slack wax, a given amount of deoiling solvent will necessarily become saturated with oil and low melting point waxes after a number of recyclings, leaving the excess of low melting point waxes with the high melting point waxes. The amount of low melting point waxes remaining undissolved with the high melting point waxes will steadily increase with each recycling of deoiling filtrate until equilibrium is reached, at which point the amount of low melting point waxes in the deoiling filtrate remains constant and the amount of low melting point wax in the undissolved high melting point wax also remains constant and the latter fraction represents the entire range of wax fractions present in the original stock to be dewaxed. However, the wax fraction will be completely deoiled since the solvent has a preferential solubility for the oil. The amount of oil in the slack wax entering the deoiling process is more or less constant so that if the proper amount of deoiling solvent is chosen, it will not become fully saturated with oil and, consequently, at least all of the oil will be removed from the slack wax. The deoiled wax cake, following the deoiling step, may then be redispersed in additional solvent and filtered at a higher temperature than employed in the dewaxing or deoiling operations in order to separate the deoiled wax into low and high melting point fractions.

Thus, it is an object of my invention to separate wax-oil mixtures into its constituent components in a very simple and economical manner.

A further object of my invention resides in separating a wax-oil mixture into substantially oil-free wax of high melting point and wax-free oil of low pour test.

An important object of my invention is to economize in the amount of crystallization regulator used in the process and to limit the amount used to substantially that necessary to start up the process.

Another object of my invention is to recover a greater amount of the low pour test oil present in wax-oil mixtures than heretofore recovered in simple operations.

Other objects and features of my invention will be apparent from the following description of the invention.

According to my invention, I carry out the process of separating a wax-oil mixture into its constituent components in two stages of operation. In the first, I effect the separation of substantially all of the wax contained in the wax-oil mixture and thereby produce a low pour point oil. In the second stage, I effect the deoiling of the wax separated in the first stage and recycle the oil fraction resulting from such deoiling to the first stage. In the first stage, I employ a crystallization regulator which is soluble in the oil and solvent at the elevated temperature prior to chilling to precipitate wax but which precipitates along with the wax when the solution is chilled. In the second stage, I employ a deoiling solvent which is capable of dissolving the crystallization regulator and I employ temperature conditions such that the crystallization regulator and a portion of the low melting point waxes are dissolved in the solvent and return this mixture either with or without the contained solvent to the first stage.

The first stage of dewaxing may be carried out in accordance with any of the methods now employed for dewaxing oils. For example, I may mix the waxy stock with a small amount (0.5 to 2%) of crystallization regulator at a temperature sufficiently elevated to effect solution of the crystallization regulator in the waxy stock and then dilute the waxy stock with sufficient solvent or diluent to produce a non-viscous slurry which filters rapidly at the dewaxing temperature. The solution is then chilled to a sufficiently low temperature to crystallize substantially all of the contained wax in the mixture and the resulting chilled slurry is filtered, centrifuged or cold settled in order to separate the crystallized wax from the oil and solvent. It is preferable to wash the wax cake with a further quantity of solvent precooled to the wax separation temperature.

As solvents or diluents for this stage of the process, I may employ liquefied normally gaseous hydrocarbons, such as ethane, ethylene, propane, propylene, butane, iso-butane, butylene, or mixtures thereof; normally liquid hydrocarbons such as pentane, hexane, etc., other liquefied normally gaseous diluents, such as methyl ether, methyl chloride, dichlor-difluor-methane, etc., casinghead gasoline, naphtha, acetone, esters, mixtures of benzene and acetone and mixtures of the above. The normally gaseous diluents, in addition to diluting the oil so as to permit rapid filtration, also have the desired property of chilling the waxy stock when evaporated from the solution under reduced pressure.

As crystallization regulators I prefer to employ such materials as will dissolve in the waxy stock at elevated temperatures, but which precipitates from solution with the wax when the solution is chilled to a sufficiently low temperature. I also prefer to employ crystallization regulators which will be dissolved by the solvent, employed in the deoiling operation. Such crystallization regulators are asphalt, oxidized wax, condensation products of chlorinated waxes with benzene, naphthalene, or other aromatic compounds, stearene pitch, cracked residuum pitch, highly polymerized olefines such as is obtained by drastically polymerizing iso-butylene, unoxidized or oxidized degras or lanolin or wool grease or mixtures of aforementioned crystallization regulators.

The second stage of operation is on the slack wax resulting from the first stage of dewaxing for the purpose of removing oil therefrom. In this second stage, I prefer to heat the slack wax to a temperature sufficiently elevated to dissolve the wax in its contained oil and to drive off the solvent associated therewith. The molten wax is then introduced into a chilling and mixing column which is provided with paddles and scrapers and is surrounded with a cooling jacket. The molten wax is then slowly cooled to atmospheric temperature or lower while maintaining the wax-oil mixture fluid by continual stirring. The thus cooled wax-oil mixture is then mixed or dispersed with a small amount of a poor wax solvent, i. e., one which has a low solvent power for wax at the temperature employed. The resulting slurry is then filtered and the wax cake depositing in the filtering element is washed with a further amount of the solvent.

I have found that under such conditions of operations, the greater percentage of wax separates or crystallizes in the form of large, well-defined, oil-free crystals. The subsequent addition of the solvent to the cooled wax does not change the crystal structure, nor dissolve appreciable quantities of the crystallized wax, and a slurry is thus formed which filters very rapidly. Also, a compact wax cake is formed on the filter which will not crack during filtration, or while washing with solvent. The wax cake will contain less than 1% of oil and be very light in color so that a treatment with 1% to 5% of filter clay at 350°–400° F. will make a water-white marketable product of it, no acid treatment being necessary.

If the solvent for the deoiling operation has been properly chosen and if the temperature conditions of deoiling are sufficiently elevated to ensure solution of all oil and low melting waxes, the filtrate will also have dissolved in it substantially all of the crystallization regulator used in the first stage of dewaxing. This filtrate is then stripped of the contained solvent and the solvent-free filtrate is mixed with another batch of waxy stock to be dewaxed in the first stage. If the solvent employed in the deoiling step is similar to that of the first stage, the filtrate from the deoiling step may be passed directly to the first stage without prior stripping of solvent. This may also be accomplished when the first dewaxing stage is carried out with mixed solvents and the deoiling step is carried out with one of the solvents forming the mixed solvent.

In cases of slack waxes, which at temperatures even above 100° F., are extremely viscous so that it is difficult to continue the cooling with stirring to atmospheric temperatures or lower, it is preferable to mix a small amount of the non-viscous solvent with the wax at a point during cooling when the mass becomes difficult to stir or even before. The remaining solvent may then be added after the mixture has been cooled to the desired temperature. The amount of solvent used will depend, of course, upon the desired viscosity of the resulting slurry. It is merely necessary to use an amount of solvent to lower the viscosity of the oil sufficiently to obtain rapid filtration. I have found that I may use as little as 0.25 to 0.75 volume of solvent per volume of the wax treated to obtain a slurry which filters readily, although I have used as much as 1.5 to 2.5 volumes of the solvent. If desired a light hydrocarbon oil fraction, such as a light lubricating oil or gas oil from which wax is known to separate by cooling in the crystal form may be used to reduce the viscosity of the wax. This may be mixed either prior to any cooling or after partial cooling of the wax.

As solvents for the deoiling operation, I may use ketones, such as methyl ethyl ketone, acetone, etc., alcohols such as butyl, amyl, propyl alcohol, etc., esters such as ethyl acetate; ethers such as di-ethyl ether, iso-propyl ether, etc; chlorinated hydrocarbons such as ethylene dichloride, trichlorethylene, etc. In some cases where wax-oil mixtures containing oil of high viscosity index are to be treated, I may employ a mixture of benzene or naphtha or an aromatic solvent and any of the above solvents in order to obtain complete miscibility of the oil in the wax-oil mixture with the solvents at the temperature of operation.

While I prefer to carry out the deoiling operation in the above manner, it will be understood that other methods of deoiling may be employed which are effective to separate the low melting point waxes, oil and crystallization regulator from the slack wax. These may then be recycled to oil to be dewaxed. For example, I may dissolve the slack wax in a solvent and then chill the solution to crystallize a part of the wax from solution to produce a slurry which is then filtered. The filtrate may then be recycled to the dewaxing stage, and if the same solvent is employed for the deoiling as for the dewaxing operation, the filtrate may be passed directly to the dewaxing stage. However, in this process the separation of oil from the slack wax is not as complete as in the hereinabove described method since the crystal formation is not of the desired type and also the wax cake cracks badly during filtration and/or washing. However, such methods of treating the slack wax are employed and my invention resides in an improvement thereon.

The method of operation of my invention may perhaps be better understood by reference to the description of the drawing. Referring to the drawing, a waxy stock, for example, a raffinate derived from the selective solvent extraction of an S. A. E. 50 waxy distillate produced by the vacuum distillation of a Santa Fe Springs crude oil, or the raw distillate itself, or other raw distillates or raffinates obtained from waxy crude oils or a crude oil residue containing wax is withdrawn from tank 1 via line 2, controlled by valve 3, and is pumped by pump 4 into line 5 into which a small amount, i. e. 1% of a crystallization regulator such as oxidized wax or asphalt is introduced via line 6, controlled by valve 7. The mixture is then passed through mixer 8 where the filter aid is completely dissolved at an elevated temperature and then passes into line 9 where it is mixed with solvent; for example, liquefied propane under pressure withdrawn from tank 10 via line 11, controlled by valve 12 and pumped by pump 14 through line 15 into line 9. The solution of propane and oil is then passed under pressure into chiller 16 where the solution is chilled to a sufficiently low temperature to crystallize substantially all of the wax contained in the solution. The chilling may be accomplished by opening valve 18 on line 17 which reduces the pressure in the chiller and allows a portion of the propane to vaporize. By reducing the pressure to atmospheric, temperatures as low as −40° F. may be obtained on the resulting slurry in the chiller. It is preferable to reduce the pressure gradually during the chilling so that the chilling rate is not appreciably greater than 3° or 4° F. per minute. Propane vaporized from the solution passes via line 17 and valve 18 to the suction of compressor 19 where the gases are compressed and passed into line 20 and condenser 21 where the propane is condensed. The condensed propane is returned to storage tank 10 via line 22.

When a temperature of about 0° to −40° F. is attained in the chiller, the resulting slurry is withdrawn via line 23 controlled by valve 24, and is pumped by pump 25 into filter 26 where the wax suspended in the slurry is separated from the oil and propane. The filtrate is passed via line 27 through heater 28 where the temperature is raised to permit vaporization of the propane from the oil and the heated mixture is passed via line 29 into evaporator 30, provided with closed heating coil 31 and mist extractor 32 where the propane is vaporized from the dewaxed oil. The dewaxed oil is withdrawn via line 33, controlled by valve 34, and is pumped by pump 35 through line 36 into storage tank 37.

The wax in filter 26 is withdrawn via line 38, controlled by valve 39 and is pumped by pump 40 through line 41, heater 42 and line 43 into evaporator 44 provided with closed heating coil 45 and mist extractor 46 where propane is separated from the wax. The propane vaporized in evaporator 30 is withdrawn via line 47, controlled by valve 48 and that vaporized in evaporator 44 is withdrawn via line 49 controlled by valve 50 and the propane vapors are compressed in compressor 19, condensed in condenser 21 and returned to storage tank 10.

The molten slack wax is withdrawn from the bottom of evaporator 44 via line 51 controlled by valve 52 and is pumped by pump 53 through line 54 into chilling and mixing column 55. Column 55 is provided with a jacket 56, into which a cooling liquid to cool the wax-oil mixture may be introduced via line 57 and withdrawn via line 58. Column 55 is also provided with agitating or stirring paddles and scrapers 59 on shaft 60 which is rotated by pulley 61 connected to a suitable source of power, not shown. The molten wax-oil mixture is gradually cooled in column 55 to the desired temperature while it is constantly stirred by the agitating paddles and scrapers. The stirring is conducted very slowly at a rate merely sufficient to prevent the wax-oil mixtures from setting up into a solid non-fluid mass.

When the desired temperature on the wax-oil mixture has been reached, a poor wax solvent such as methyl ethyl ketone, or other poor wax solvents herein mentioned, is mixed with the wax-oil mixture in order to produce a slurry which filters readily. Such solvents may be mixed with the cooled wax-oil mixture in column 55 and are withdrawn from storage tank 62 via line 63 controlled by valve 64 and pumped by pump 65 through line 66 and cooler 67 and line 68, controlled by valve 69 and line 70 into the column. The solvent is preferably cooled to the temperature prevailing in the column or to a lower temperature so as to prevent re-solution of crystallized wax. If desired, a portion of the solvent may be mixed with the wax-oil mixture prior to cooling of the latter to the final filtration temperature.

After the solvent has been mixed with the cooled wax-oil mixture containing the desired crystallized wax, the resulting slurry is withdrawn from the bottom of the column via line 71 controlled by valve 72, and the slurry is pumped by pump 73 through line 74 to filter 75 where the wax suspended in the slurry by chilling is separated from the solution. The solution is then passed through line 76, heater 77 and line 78 into evaporator 79, provided with closed heating coil 80 and mist extractor 81.

The wax separated in filter 75 is withdrawn via line 82 controlled by valve 83 and is pumped by pump 84 through heater 85 and line 86 into evaporator 87 provided with closed heating coil 88 and mist extractor 89. The solvent-free wax is withdrawn from the evaporator via line 90, controlled by valve 91 and is pumped by pump 92 through line 93 into storage tank 94. This wax may be fractionated into relatively low and relatively high melting point waxes in fractionator 95 in the manner as explained above.

Prior to the removal of the wax cake depositing on the filtering element of filter 75, it is preferable to wash the wax cake with a small amount of the same solvent from tank 62. The solvent may be passed into the filter via line 68' controlled by valve 69' and line 74. The solvent containing the washed constituents of the filter cake may also be passed to evaporator 79.

The solvent vapors from evaporator 87 are passed into line 95 controlled by valve 96 and those from evaporator 79 are passed into line 97 controlled by valve 98. These are then passed through line 99 to condenser 100 and 101 to solvent tank 62.

The low melting point wax, oil and filter aid is withdrawn from the bottom of evaporator 79 via line 102 controlled by valve 103, and is pumped by pump 104 into line 105, controlled by valve 106 and is recycled to line 2 or to tank 1 for admixture with the stock to be dewaxed. If desired, a portion or all of this wax fraction may be passed into storage tank 107 via line 108 controlled by valve 109.

It will be observed that in the foregoing description of the drawing, I have shown only single pieces of apparatus for carrying out the process. It is to be understood that duplicate equipment as, for example, the chilling and mixing column, or chiller or filter, etc., may be provided where necessary which may be operated alternately so that the process may be carried out more or less continuously.

The following is submitted as a specific example of the process forming the subject matter of my invention. It is to be understood, however, that this is not to be construed as limiting my invention, but merely as representative of a typical example thereof.

A raw lubricating oil distillate obtained from the vacuum distillation of Santa Fe Springs crude oil was extracted with about 3 volumes of phenol at a temperature of 180° F. The raffinate resulting from such extraction had an A. P. I. gravity of 31.5°, a viscosity of 65 seconds Saibolt Universal at 210° F., a pour point of 110° F. and a wax content of approximately 23%. The waxy raffinate was mixed with about 1.5% of oxidized wax at a temperature of about 250° F. The resulting mixture was then mixed with about 3 volumes of liquid propane at a temperature of about 120° F. and under a pressure of about 250 pounds per square inch. The resulting solution was then gradually chilled to about −40° F. whereupon substantially all of the wax contained in the oil was crystallized in the solution. Chilling was accomplished by gradually reducing the pressure on the solution and vaporizing propane so as to obtain a chilling rate of about 3° or 4° F. per minute. Make-up propane was added continuously during chilling in order to maintain a ratio of about 3 volumes of propane to one of the oil.

The resulting chilled slurry was then filtered under a differential pressure of about six pounds per square inch to separate the precipitated wax which was composed of high melting and low melting point waxes and the oxidized wax crystallization regulator. The filtrate and the separated slack wax was then de-propanized.

The de-propanized wax containing the filter aid at a temperature of about 160° F. was then placed in the chilling and mixing column provided with agitating paddles and scrapers and with a water jacket through which water was circulated at about 150° F. The temperature of the circulating water was then slowly lowered to cool the molten wax at a rate of about 7° F. per hour until a temperature of about 70° F. was reached. During cooling, the wax was continually stirred. About 0.1 volume of methyl ethyl ketone was added to the wax during the chilling down to 70° F. At the completion of the chilling, a further amount of methyl ethyl ketone was added to bring the total volume up to about equal that of the wax charge. After continuing the agitation for about twenty minutes, the slurry was filtered. The resulting wax cake was washed with about 0.5 volume of the solvent, the oily wash solvent being added to the filtrate.

The combined filtrate and wash solvent was distilled to separate the solvent and the total amount of the solvent-free oil, filter aid and low melting point wax contained in the filtrate was recycled to the next batch of raffinate to be charged to the propane dewaxing operation. The above operations were repeated for seven times, that is, the filtrate resulting from the de-oiling treatment of the slack wax separated from the raffinate was recycled seven times after being freed of solvent to a new batch of raffinate to be dewaxed.

Upon completion of the run, the de-propanized filtrate from the dewaxing operation was a lubricating oil of S. A. E. 50 grade, having a pour point of −10° F., and A. P. I. gravity of 30.4°, a viscosity of 69 seconds Saybolt Universal at 210° F. and was recovered in a yield of about 77%. The average filtration rate for all the batches of propane, raffinate and recycled mixture was about five gallons per square foot of filter area per hour. Approximately 0.1% of oxidized wax crystallization regulator was used based on the total charge of raffinate dewaxed in the presence of propane.

The combined deoiled waxes recovered from the deoiling operation of the slack wax was treated with about 3% of filter clay at 400° F. which resulted in a water-white wax having a melting point of 153° F. (Galician). The filtration for all of the batches of slack wax processed was quite rapid, this being at a rate of ten gallons per square foot of filter area per hour based on the solvent-free slack wax. A yield of about 23% of the oil-free wax was obtained, the remaining portion of the wax and oil contained in the raffinate being in the filtrate resulting from the last deoiling operation. There was no tendency for the cake to crack on washing on the filter. It was observed in the deoiling operations that the deoiled wax from the first batch of slack wax was of higher melting point than the wax produced from the last batch of slack wax, and that the melting point of deoiled waxes from subsequent batches of slack wax had lower melting points than the preceding batches. However, the melting points of the deoiled waxes from the batches of slack waxes subsequent to the fourth batch were constant. The reason for this variation in melting points, as explained above, was due to the recycling of the low melting point waxes along with oil and crystallization regulator to the subsequent batches of raffinate and that, therefore, the subsequent deoiling operation was only effective to dissolve only such amount of the low melting point waxes as would saturate the solution of solvent and oil. When equilibrium concentrations of the solution for the low melting wax fraction was reached, the proportion of low melting waxes in the deoiled wax cake was found to be uniform and that the wax produced represented the entire range of wax fractions present in the original charge.

The deoiled wax was then fractionated into higher melting point and lower melting point wax fractions by dispersion in about two volumes of methyl ethyl ketone at a temperature of about 110° F. and filtering the mixture. The filtrate and wax cake were freed of solvent. From the filtrate, a wax melting at 120° F. was obtained in an amount representing 30% of the wax processed. The wax cake on the filter gave a wax melting at 160° F.

The foregoing exemplary description of my invention is not to be considered as limiting since many variations may be made within the scope of the following claims by those skilled in the art without departing from the spirit thereof.

I claim:

1. A process for separating wax from wax-oil mixtures which comprises dissolving the wax-oil mixture in a diluent, chilling the solution of wax-oil mixture and diluent to a sufficiently low temperature to crystallize substantially all of the contained wax, separating the solution of oil and diluent from the crystallized wax, removing the diluent from the solution and thereby producing a low pour test oil, heating the separated wax to a sufficiently elevated temperature to remove diluent and to melt said wax, cooling said melted wax at a slow rate and with continual agitation and in the substantial absence of solvent to a temperature sufficiently low to crystallize high melting point wax, commingling said cooled wax with a solvent having a low solvent power for the crystallized wax at the prevailing temperature but capable of dissolving oil and low melting point wax, separating the solution of oil and low melting point wax from the high melting point wax and returning said oil and low melting point wax to wax-oil mixture to be dewaxed according to said first mentioned dewaxing steps.

2. A process for separating wax from wax-oil mixtures which comprises dissolving the wax-oil mixture and a crystallization regulator in a diluent, chilling the solution of wax-oil mixture, crystallization regulator and diluent to a sufficiently low temperature to crystallize substantially all of the contained wax and crystallization regulator, separating the solution of oil and diluent from the crystallized wax and crystallization regulator, removing the diluent from the solution and thereby producing a low pour test oil, heating the separated wax and crystallization regulator to a sufficiently elevated temperature to remove diluent and to melt said wax, cooling said melted wax at a slow rate and with continual agitation and in the substantial absence of solvent to a temperature sufficiently low to crystallize high melting point wax, commingling said cooled wax with a solvent having a low solvent power for the crystallized wax at the prevailing temperature but capable of dissolving oil, the crystallization regulator and low melting point wax, separating the solution of oil, crystallization regulator and low melting point wax from the high melting point wax and returning said oil, crystallization regulator and low melting point wax to wax-oil mixture to be dewaxed according to said first mentioned dewaxing steps.

3. A process for separating wax from wax-oil mixtures which comprises chilling the wax-oil mixture to crystallize the wax, separating the crystallized wax from the oil, heating the separated wax to a sufficiently elevated temperature to melt said wax, cooling said melted wax at a slow rate and with continual agitation to a temperature sufficiently low to crystallize high melting point wax, commingling said cooled wax with a solvent having a low solvent power for the crystallized wax at the prevailing temperature but capable of dissolving oil and low melting point wax, separating the solution of oil and low melting point wax from the high melting point wax and returning said oil and low melting point wax to wax-oil mixture to be dewaxed according to said first-mentioned dewaxing steps.

4. A process for separating wax from wax-oil mixtures which comprises chilling said wax bearing oil to a temperature sufficiently low to crystallize substantially all of the contained wax, separating the oil from the crystallized wax, heating the separated wax to a temperature sufficiently high to melt said wax, cooling said melted wax at a slow rate and with continual agitation and in the substantial absence of solvent to a temperature sufficiently low to crystallize high melting point wax, commingling said cooled wax with a solvent having a low solvent power for the crystallized wax at the prevailing temperature but capable of dissolving oil and low melting point wax, separating the solution of oil and low melting point wax from the high melting point wax and returning said oil and low melting point wax to wax-oil mixture to be dewaxed according to said first mentioned dewaxing steps.

5. A process as in claim 4 in which said high melting point wax is fractionated into relatively low and relatively high melting point waxes.

DONALD E. CARR.